United States Patent [19]

Collias

[11] 4,299,161
[45] Nov. 10, 1981

[54] RING AND SNAP-ON RING FOR PREVENTING BUCKLE OF BEER CANS

[75] Inventor: George J. Collias, Oak Park, Ill.

[73] Assignee: Kepros-Ganes Company, Oak Park, Ill.

[21] Appl. No.: 134,956

[22] Filed: Mar. 28, 1980

Related U.S. Application Data

[63] Continuation-in-part of Ser. No. 940,563, Sep. 8, 1978, Pat. No. 4,219,578, and a continuation-in-part of Ser. No. 101,580, Dec. 12, 1979, Pat. No. 4,255,457.

[51] Int. Cl.³ .............................................. A23L 3/04
[52] U.S. Cl. ....................................... 99/369; 53/425; 220/73; 220/85 K; 422/302
[58] Field of Search .................. 99/369; 426/131, 407, 426/279; 220/73, 319, 320, 67, 68, 69, 85 H, 85 K; 422/25, 302, 303, 304; 53/425, 440

[56] References Cited

U.S. PATENT DOCUMENTS

| | | | |
|---|---|---|---|
| 516,073 | 3/1894 | Booth | 220/73 |
| 578,375 | 3/1897 | Tygert | 99/369 |
| 1,732,589 | 10/1929 | Plummer | 99/369 |
| 2,591,482 | 4/1952 | Weltlich | 220/319 |
| 2,616,568 | 11/1952 | Bundgus | 99/369 |
| 3,029,724 | 4/1962 | Lee | 220/320 X |
| 3,122,990 | 3/1964 | Fried | 99/369 |
| 3,237,802 | 3/1966 | Wagner | 220/68 X |
| 3,419,240 | 12/1968 | Santic | 220/69 |
| 3,422,564 | 1/1969 | Izumi | 46/22 |
| 3,570,392 | 3/1971 | Hoover | 99/369 X |
| 3,606,074 | 9/1971 | Hayes | 220/69 |
| 3,666,388 | 5/1972 | Oberwelland et al. | 426/279 |
| 3,704,140 | 11/1972 | Petit et al. | 426/131 |
| 3,815,777 | 6/1974 | Churan | 220/319 |
| 4,111,330 | 9/1978 | Jordan | 220/319 |

FOREIGN PATENT DOCUMENTS

| | | | |
|---|---|---|---|
| 28874 | 6/1918 | Norway | 426/131 |
| 156411 | 7/1963 | U.S.S.R. | 426/131 |
| 163030 | 5/1964 | U.S.S.R. | 220/319 |

*Primary Examiner*—Billy J. Wilhite
*Attorney, Agent, or Firm*—Cook, Wetzel & Egan, Ltd.

[57] ABSTRACT

An anti-buckle ring is described for preventing buckling of beer-can tops during pasteurization of the beer. The anti-buckle ring is mated with each beer can such that the ring captures the double-seamed top of the can. The ring prevents radial displacement at key points of the top and, hence, buckling of the top end of the can, when the heat applied during pasteurization causes the internal pressure of the can to increase.

7 Claims, 12 Drawing Figures

RING AND SNAP-ON RING FOR PREVENTING BUCKLE OF BEER CANS

CROSS-REFRENCE TO RELATED APPLICATION

This is a continuation-in-part of copending application Ser. No. 940,563, filed Sept. 8, 1978, and issued as U.S. Pat. No. 4,219,578, and a continuation-in-part of copending application Ser. No. 101,580, filed Dec. 12, 1979, now U.S. Pat. No. 4,255,457.

BACKGROUND OF THE INVENTION

This invention relates generally to apparatus used in the processing of canned beer, and is particularly directed to eliminating the problem of can buckling of the attached top during the pasteurization of beer.

It is conventional to pasteurize canned beer by conveying filled and sealed cans of beer to a heat treatment station at which the beer is pasteurized. This heat treatment is intended to inactivate whatever yeasts remain in the beer to prevent further fermentation.

During such heat treatment, carbon dioxide is released from the beer and addeds to that already at the headspace of the can, thereby raising the internal pressure on the can to the greatest degree it will normally experience. This high pressure can buckle the shape of the can, particularly its top and bottom which are the weakest areas of the can in this respect. To prevent such buckling, a much thicker metal sheet is used to strengthen the can's top and bottom, compared to the sidewall. However, this increases the cose of the can.

Similar problems with can buckling have long been known in industries other than beer canning. In some instances, a food-containing can is mated with at least two and up to four shape-retaining pieces which are held by vice-like members during the heat reatment. Such a solution has not found acceptance in the beer canning industry, however, because it would require major changes within the existing conventional pasteurizer, such as: new equipment for placing, holding, and conveying all the close-fitting shape-retaining pieces over each beer can, and; new heat transfer equipment for heating beer cans that are surrounded by these pieces. Such changes are not conveniently adaptable to the conventional pasteurizer which is designed to heat and convey each beer can as part of a several-foot-wide, standing group by using overhead hot-water sprays and walking beam conveyors, respectively.

Thus, prevention of can buckling has only been achieved by using a much thicker gauge metal sheet for the ends of beer cans, an undesirable solution.

OBJECTS OF THE INVENTION

Accordingly, it is an object of the invention to provide apparatus for preventing buckling of the tops of filled beer cans during the beer's pasteurization.

It is a more specific object of the invention to provide a simple anti-buckle ring arrangement which is usable with the equipment of conventional pasteurizers and which is relatively inexpensive.

BRIEF DESCRIPTION OF THE FIGS.

The above and other objects of the invention are more particularly set forth in the following detailed description and in the accompanying drawings of which.

SUMMARY OF THE INVENTION

Broadly stated, buckling of beer-can tops during the beer's heat treatment in the pasteurizer is prevented by an anti-buckle ring means which encircles and braces the seamed top of the can from radial displacement. The ring means mates with the can prior to heat treatment in the pasteurizer. The seamed top of each beer can is held by the ring means from radial displacement which may otherwise occur during the heat treatment within the pasteurizer, and buckling of the top of the can is prevented by virtue of the seamed top being held from radial displacement. After pasteurization, the ring means is automatically removed from the can for further use with another can.

DESCRIPTION OF THE PREFERRED EMBODIMENT

Figure 1:
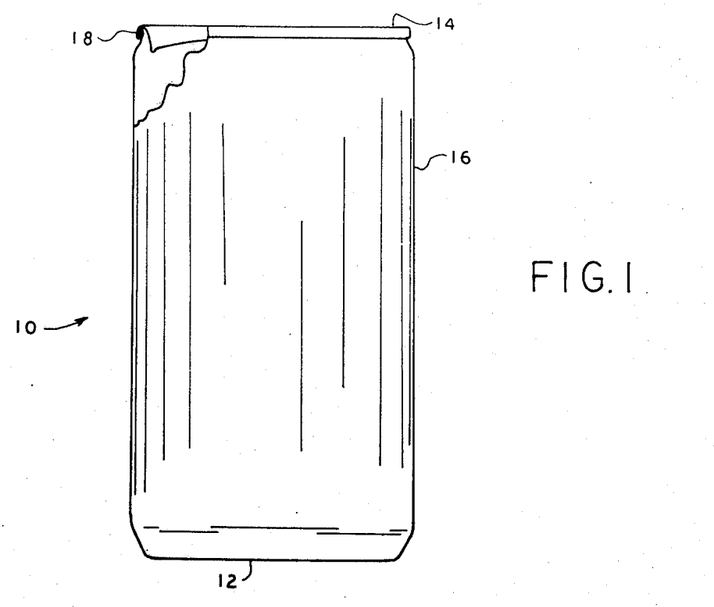
FIG. 1 illustrates a conventional beer can with its top partially broken away to reveal its double seam.

Referring now to FIG. 1, there is shown a conventional beer can 10 having a bottom 12, a top 14, and a circumferential sidewall 16. Typically, the bottom 12 and the sidewall 16 of the can body are formed from a single piece of metal sheet and the top 14 is formed from a separate piece of metal sheet. To join the top 14 to the sidewall 16, the top is interlaced with the sidewall to form a double-hook interlock called a "double-seam" as in dicated at 18. Voids in the double seam 18 between the top 14 and the sidewall 16 are sealed by a rubber-resinbased compound that is applied on the inside flange of the top after the top has been formed.

During pasteurization of the beer, the can and its contents are subjected to high temperatures, usually by subjecting the can to a hot-water spray. As a result of the high temperaure to which the beer rises, carbon dioxide is released from the beer and adds to that already in the head-space in the can. If the pressure of the carbon dioxide becomes greater than the beer can top 14 and the double-seam 18 can resist, the double-seam becomes distorted radially outward and the top buckles upwardly. In the past, a relatively thick metal sheet has been used to fabricate the top 14 to resist such buckling.

Figure 2:
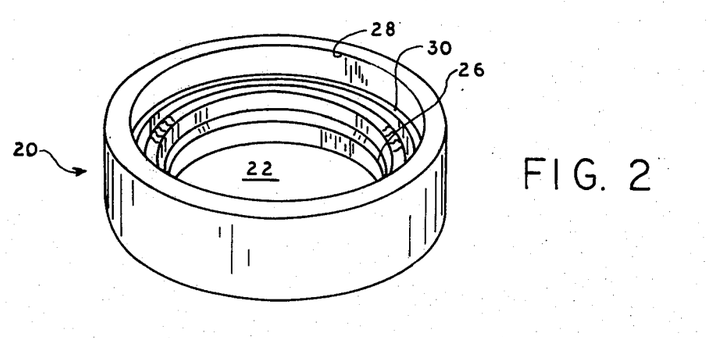
FIG. 2 is a perspective view of an anti-buckle ring embodying various aspects of the invention.
Figure 3:
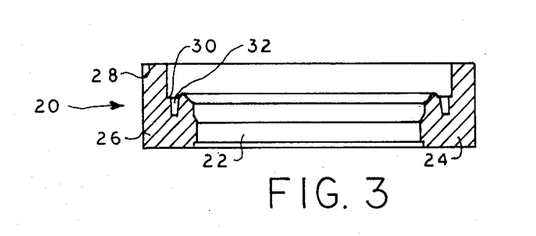
FIG. 3 is a cross-sectional view of the anti-buckle ring shown in FIG. 2.

In order to use a thinner gauge and, hence, less expensive material for the top 14, and anti-buckle means preferably in the form of a ring 20, which may be constructed as shown in FIGS. 2 and 3, is slipped over the top of the can before pasteurization of the beer.

Figure 4:
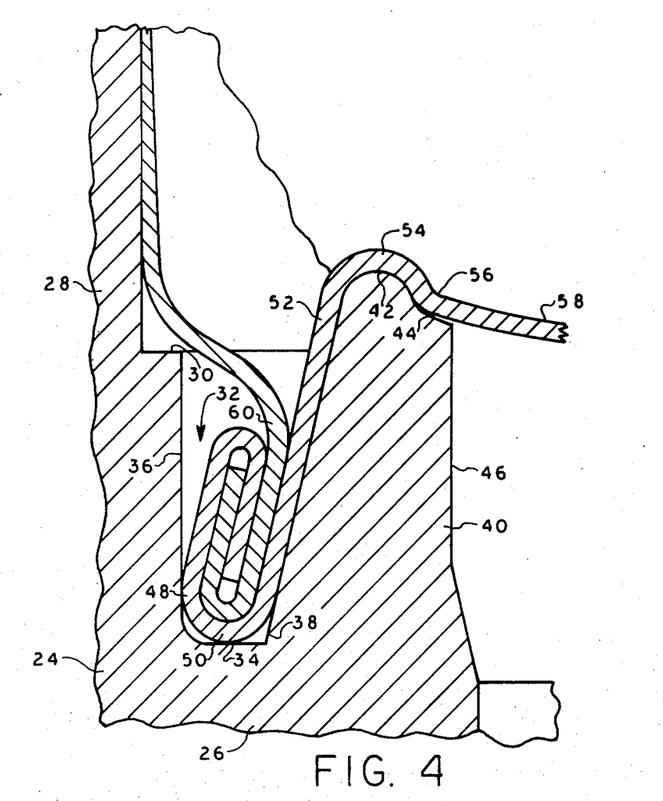
FIG. 4 is a cross-sectional view illustrating approximately one-half of the seamed top of a beer can and the way in which the double seam and related areas are captured by the anti-buckle ring of FIG. 2.

As shown, the ring 20 has a central aperture 22 surrounded by a circumferentially extending outer flange 24. The flange 24 includes a relatively thick base portion 26 extending radially toward the aperture 22 and a narrower top portion 28, the latter of which meets the base portion 26 at an interface 30. Disposed in the flange 24 is a circularly extending groove 32 defined by a bottom wall 34, an outer wall 36 and an inner wall 38, as best shown in FIG. 4. Extending upwardly from the base portion 26 is circumferentially extending inner flange 40 bounded by the inner wall 38, a rounded top wall 42, a rounded fillet 44, and an innermost wall 46.

As shown in FIG. 4, the outer flange 24 and the base portion 26 are dimensioned such that the ring is adapted to slip onto the top of a beer can with the base portion of the ring at least closely adjacent the top of the double seam and the outer flange 24 holding the double seam from radial displacement. More specifically, the double seam 18 is received within the groove 32 as shown, whereby the wall 36 is closely adjacent or in contact with the outer circumferential portion of the double seam 18 as at the seaming wall radius 48. Further, the bottom wall 34 is in contact with or closely adjacent to the bottom or seaming panel 50 of the double seam 18, and the wall 38 of the inner flange 40 is in contact with or closely adjacent to the inner circumferential portion of the double seam 18, preferably at the so-called chuck wall 52 of the can. The top wall 42 is contoured to conform to the contour of the chuck wall radius 54 and is in contact with or closely adjacent thereto. The rounded fillet 44 is likewise contoured to conform to the contour of the can's panel radius 56 and is in contact with or closely adjacent thereto.

The reasons for including the inner flange 40 are to brace the double seam 18 from radial displacement, to prevent buckling at chuck wall radius 54, panel radius 56, and panel 58 that can occur if the panel is permitted to bulge unsymmetrically, and to prevent separation between the chuck wall 52 and the body wall 60 of the can body, particularly for cans having deep aluminum tops. It has been found that increased pressure within the beer can causes the domed center portion of the beer can top to bulge away from the contents. This bulging action concurrently increases the angle between the chuck wall 52 and the body wall 60. The points along the chuck wall 52 which resist this tendency to separate become the weakest points and become distorted radially outward, adjacent points being distorted radially inward. This also causes distortion of the chuck wall radius 54, the panel radius 56 and, of course, the domed top of the beer can. Because of the inclusion of the inner flange 40 and the contact or at least close proximity between mutually conforming portions of the can's top and the ring's inner flange, the buckling of the beer can top and the distortion of the double seam is prevented.

Figure 5:
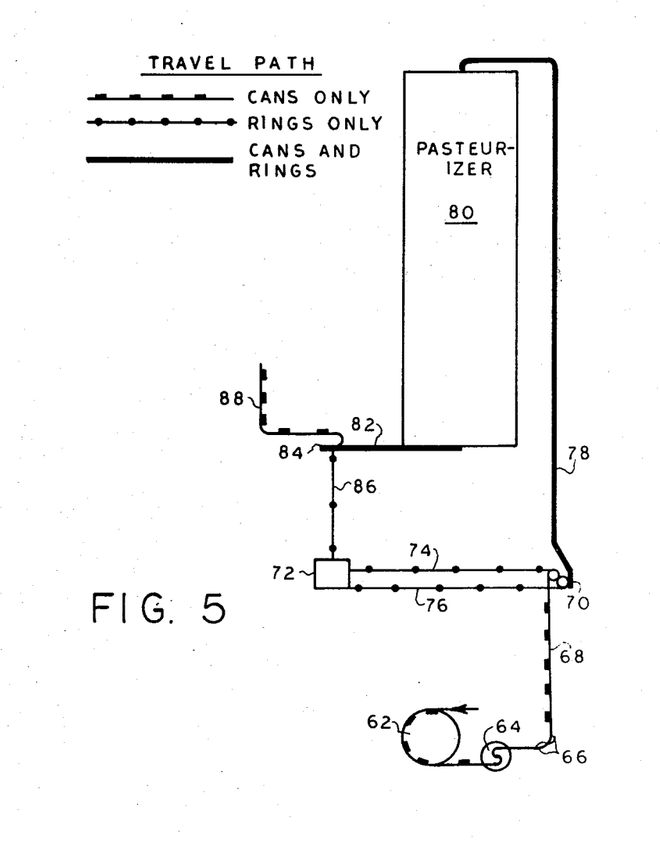
FIG. 5 is a schematic illustration of a beer canning method utilizing the anti-buckle ring of FIG. 2.

A beer processing method utilizing the antibuckle ring 20 is illustrated schematically in FIG. 5. The conveying path for the beer cans only is illustrated by the line having small rectangles thereon, the conveying path for the anti-buckle ring only is illustrated by the lines having circles thereon, and the conveying path for the beer cans when mated with the anti-buckle ring is shown by the heavy solid lines.

Near the bottom of FIG. 5 there is shown schematically a beer filler 62 which is conventional in construction for filling each can with beer. The filled beer cans are then conveyed to a conventional double seamer 64 which forms seams such as the double-seam 18 in the top of the beer cans. After the seams are formed, the cans are conveyed to an inverter indicated schematically at 66 for inverting the cans so that their top is facing downwardly. Following their inversion, the beer cans are conveyed, top down, along the path 68 to an assembler 70 which mates each beer can with an anti-buckle ring.

The conveyance path for the anti-buckle ring begins at a collection/dispersement hopper 72 from which the rings are conveyed via a path 74 to the assembler 70. A return conveyor path 76 returns rings to the hopper 72 which are in excess of the number of beer can conveyed to the assembler 70.

At the assembler 70, described in more detail hereinafter, an anti-buckle ring is mated with the downwardly facing top of each beer can and then the combination of the beer can and its anti-buckle ring are conveyed along a path 78 to a pasteurizer 80. The pasteurizer 80 may be of conventional design, wherein the cans are heat treated by an overhead spray, in which case the anti-buckle rings, because of their small geometry and their minimum covering of the cans, do not substantially hinder the heating of the cans or their contents. Moreover, the fact that the rings do not substantially interfere with the pattern of spray allows their use with conventional pasteurization processes, especially when the cans are inverted during pasteurization.

When pasteurization is complete, the cans leave the pasteurizer 80 in single file, their tops facing downwardly and resting on their anti-buckle rings. Thus disposed, the cans and rings are conveyed along a path 82 to a can/ring separator indicated schematically at 84. At the separator 84, the cans are separated from their respective rings so that the rings may be returned via path 86 to the hopper 72 for reuse. The cans are preferably inverted by the separator 84 and conveyed along a path 88 with their tops facing upwardly for further processing or shipment.

Separator 84 may be of the type which first inverts the cans and then passes them under an overhead magnetic conveyor which lifts the rings away from the cans. The rings are then conveyed to the path 86 for further use and the cans are conveyed to the path 88. When this type of separator is used, the rings 20 are, of course, constructed with a magnetically attractable material.

In a preferred embodiment of the separator 84, the cans from the pasteurizer 80 are transferred onto a flat top, two-belt conveyor where they are spaced at fixed intervals by a feed screw, for example. Two L-shaped, metal side strips, with horizontal ledges pointing the center of the can travel path and vertical ledges downward, guide the rings and hold them during the separation. Cam driven pusher rods, attached to a conveyor within the two flat top belts, are moved in synchronism with the screw conveyor such that they enter the antibuckle ring openings 22 from the bottom and push the beer cans away from the rings, lifting the beer cans onto another level to be conveyed to the path 88. After the pusher rods withdrawn from the cans, they are lowered to exit from the ring's opening 22 so that the rings may be conveyed back to the hopper 72 via the path 86.

Figure 6:
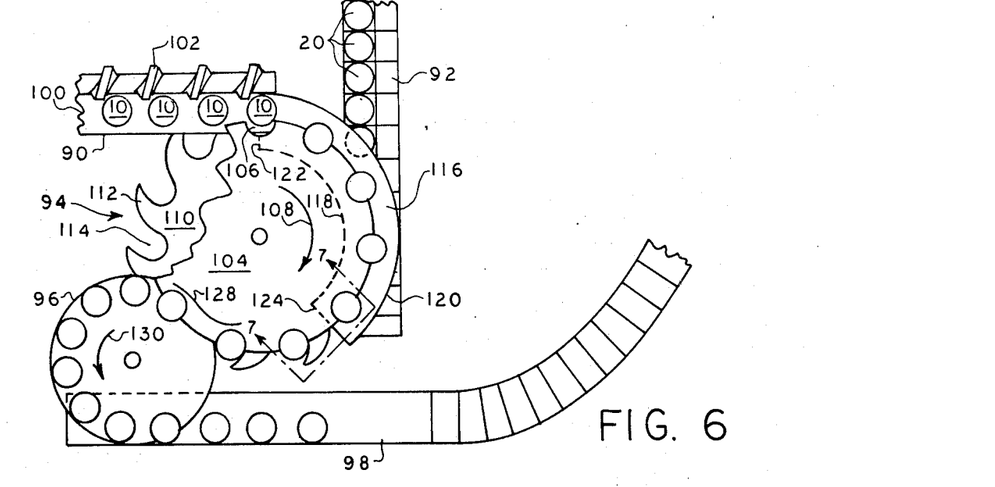
FIG. 6 is a top plan view, somewhat schematic, of a can/ring assembler for use with the method depicted in FIG. 5.

Preferring now to FIG. 6, there is shown a preferred embodiment of the can/ring assembler 70. The assembler 70 includes a feed conveyor 90 for the beer cans 10, a feed conveyor 92 for the anti-buckle rings 20, a turret assembly 94 for mating the rings 20 with the beer cans 10, and a rotating disc 96 for removing the mated beer cans and rings from the turret assembly 94 and for placing them on a conveyor 98.

The feed conveyor 90 includes a driven belt 100 for carrying the cans 10 toward the turret assembly 94 and a feed screw 102 for spacing the beer cans at fixed intervals on the belt 100.

The turret assembly 94 includes a rotating pocket turret 104 (partly broken away) having semi-circular pockets 106 spaced around its outer periphery for capturing the beer cans 10 as illustrated. Thus, as a beer can reaches the end of the belt 100, it is grabbed by a pocket 106 and moved in an arcuate path as indicated by the arrow 108.

Spaced below and rotating in synchronism with the pocket turret 104 is a starwheel 110 for grabbing the anti-buckle rings 20 as they arrive from the conveyor 92. The starwheel 110 includes a plurality of finger-like protrusions 112 spaced around the periphery of the starwheel 110. Between adjacent protrusions 112, there are gaps 114 into which the rings 20 are urged by the protrusions 112. Thus, as the turret assembly 94 rotates, the beer cans are urged into the pockets 106 of the pocket turret 104 and the anti-buckle rings 20 are captured by the gaps 114 in the starwheel 110. The gaps 114 are equal in number to the pockets 106 and vertically aligned therewith so that each ring 20 is in vertical alignment with its associated beer can as the two are rotated in the direction of the arrow 108.

Figure 7:
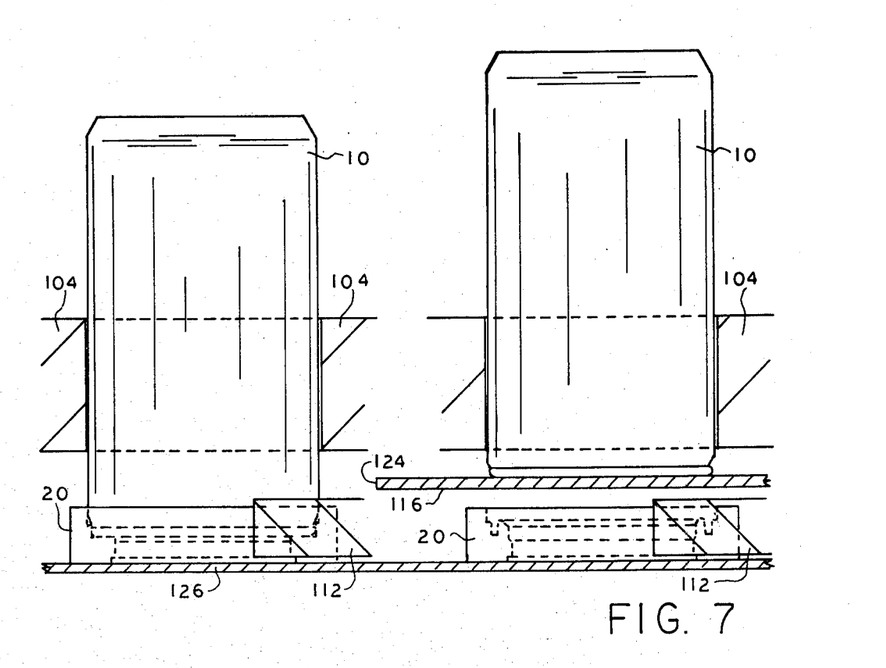
FIG. 7 is a sectional view taken along lines 5 7—7 of FIG. 6.

The turret assembly 94 also includes a separator plate 116 which is located between the starwheel 110 and the pocket turret 104. As shown, the separator plate 116 has a pair of parallel, arcuate edges 118 and 120 which extend from a leading edge 122 of the plate 116 to its trailing edge 124. Separator plate 116 is spaced beneath the pocket turret 104 by a distance such that the bottoms of the beer cans 10 rest on the upper surface of the separator plate 116 while the cans 10 are being conveyed from the leading edge 122 of the plate 116 to its trailing edge 124. This arrangement is shown more clearly in FIG. 7. As shown at the right of FIG. 7, a beer can 10 is carried by the pocket turret 104 with its top resting on the separator plate 116. Below the separator plate 116 is a ring 20 held in a gap 114 in the starwheel 110 between adjacent starwheel protrusions 112. As the turret assembly 94 rotates the can 10 and its associated ring 20 beyond the trailing edge 124 of the plate 116, the beer can 10 falls by gravity into the ring 20, as illustrated in the leftmost portion of FIG. 7. In this condition, the side wall of the can 10 is still held by the turret 104 but the top of the can 10 is now in a gap 114 between adjacent starwheel protruberances 112.

Also shown in FIG. 7 is a plate 126 (omitted from FIG. 6 for clarity) which extends circularly beneath the starwheel 110 for supporting the rings 20 during their arcuate conveyance by the starwheel 110. When the can 10 drops into the ring 20, both the can and the ring 20 are supported by the plate 126.

As the cans and rings are conveyed in mating relationship, they eventually are urged onto the rotating disc 96 by a guide rail 128 which is supported by means not shown for engaging the side wall of a can and for directing it onto the rotating disc 96, the latter of which then rotates the cans and their mating rings in the direction of the arrow 130. The conveyor 98 which is disposed beneath the disc 96 receives cans and their mating rings from the disc 96 for conveyance to the pasteurizer 80. Although not shown in FIG. 6, a guide rail similar to guide rail 128 may be disposed above the rotating disc 96 and the conveyor 98 for urging the beer cans 10 onto the conveyor 98.

Figure 8:
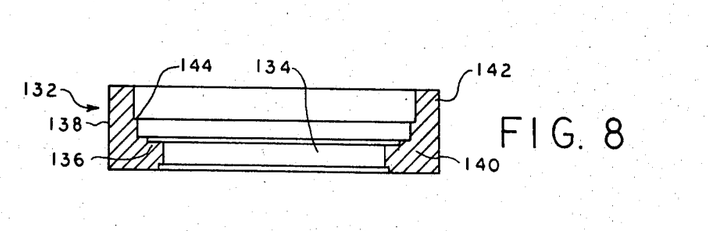
FIG. 8 is a cross-sectional view of an alternate embodiment of the anti-buckle ring.

The anti-buckle ring described above provides superior anti-buckle protection, particularly for beer cans having deep tops, i.e., cans whose tops extend approximately one-quarter inch below their seaming panel. To prevent buckling of cans whose tops are more shallow, an alternate anti-buckle ring 132 may be employed, as shown in FIGS. 8 and 9.

As shown in cross-section, the ring 132 has a central aperture 134 surrounded by a substantially flat base portion 136. The outer radial portion of the ring 132 comprises an outer, vertically extending flange 138 having a relatively thick bottom portion 140 and a narrower top portion 142 meeting the bottom portion 140 at an interface 144. The base portion 136 and the flange 138 are dimensioned such that the ring 132 is adapted to slip onto the top of a beer can with the base portion 136 engaging or at least closely adjacent the top of the double-seam and with the flange 138 engaging or closely adjacent the double-seam. With this arrangement, the flange 138 holds the double-seam from outer radial displacement during heat treatment or pasteurization of the beer, thereby preventing the top of the can from buckling in response to high internal pressure on the can. To mate the ring 132 with a beer can, the ring 132 is slipped over the top of the beer can with the top portion 142 extending toward the bottom of the can.

Figure 9:
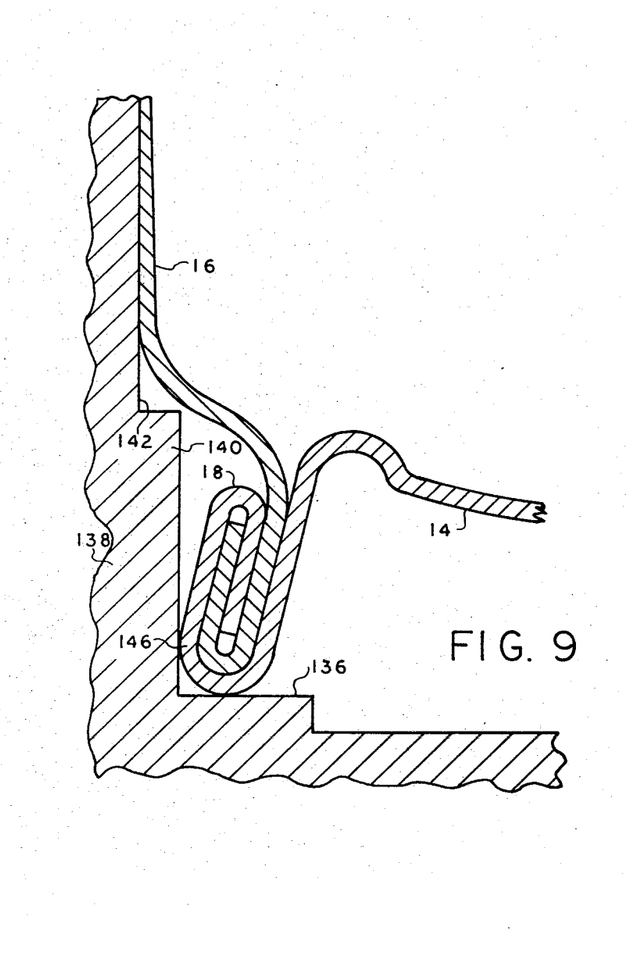
FIG. 9 is a cross-sectional view illustrating a portion of the seamed top of a beer can and the way in which its double seam is captured by the anti-buckle ring of FIG. 8.

FIG. 9 is an enlarged view of one side of the double-seam of the can illustrating the way in which the ring 132 preferably engages the can. As shown, the top of the can is facing downwardly so that the double seam 18 rests on the base portion 136 of the ring. In addition, the bottom portion 140 of the flange 138 completely encircles the double-seam 18 and is closely adjacent to or in contact with a portion 146 of the double seam 18. The upper portion 142 of the flange 138 encircles the sidewall 16 of the can and is in contact therewith or at least closely adjacent to it. The upper portion 142 of the flange does not extend all the way to the bottom of the can; preferably, it extends only about one inch beyond the top of the can to make insertion of the can into the ring easy and to reduce the expense of the ring.

With the arrangement shown in FIG. 9, it is the bottom portion 140 of the flange 138 which holds the double-seam 18 from radial displacement. The horizontal portion 136 and the top portion 142 of the flange function to locate the bottom portion 140 with respect to the double-seam 18 but do not have any substantial buckleresisting function. The ring 132 may be used with the apparatus illustrated in FIGS. 5-7 as described above.

The width of the double-seam 18 varies ±0.0025 inches due to thickness variations in the beer can's top and its body's neck. This variation affects the outer portion of the double-seam 18 and not the inner portion because the tapered seaming chuck tool provides a constant support plane against which the seaming rolls push the metal of the double seam.

Figure 10:
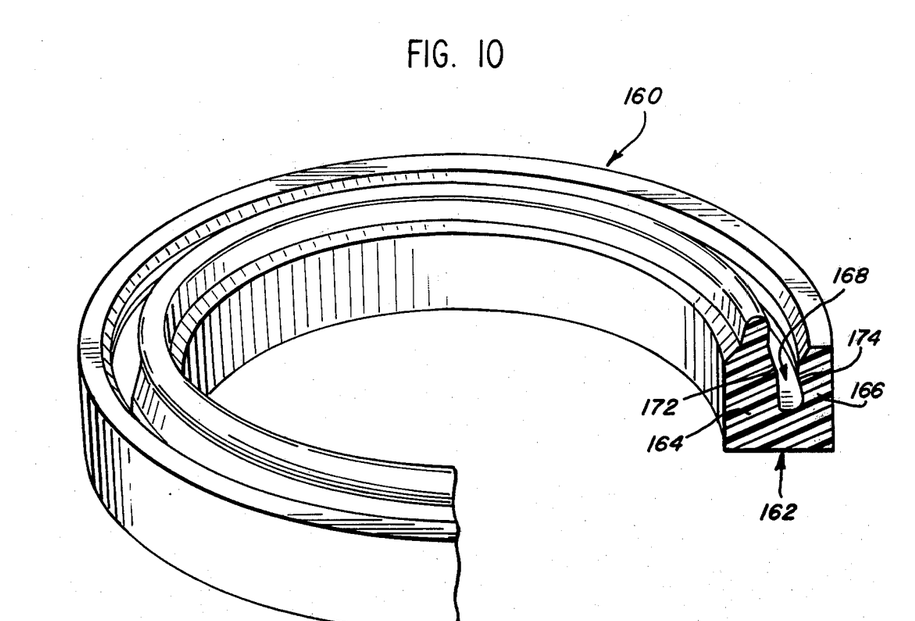
FIG. 10 is a perspective view, partly in cross-section, of another anti-buckle ring adapted to snap-fit with a beer can.
Figure 11:
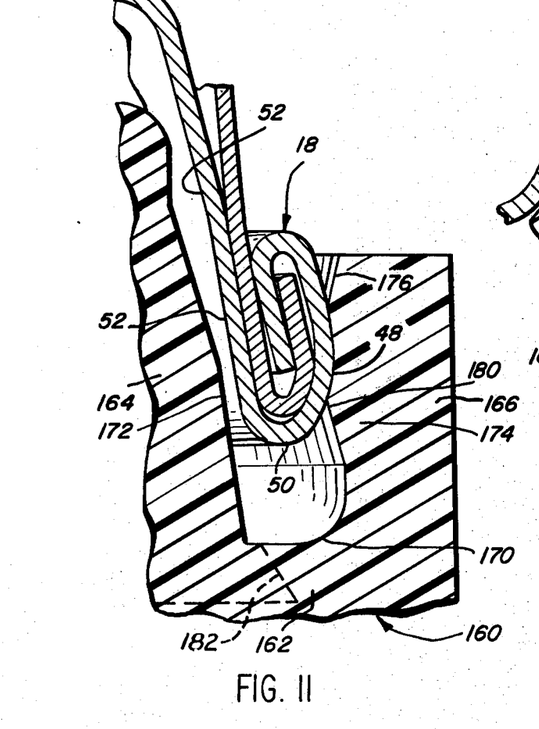
FIG. 11 is a cross-sectional view illustrating portions of the seamed top of a beer can and the anti-buckle ring of FIG. 10 just before the double seam is mated with the snap-fit portion of the anti-buckle ring.
Figure 12:
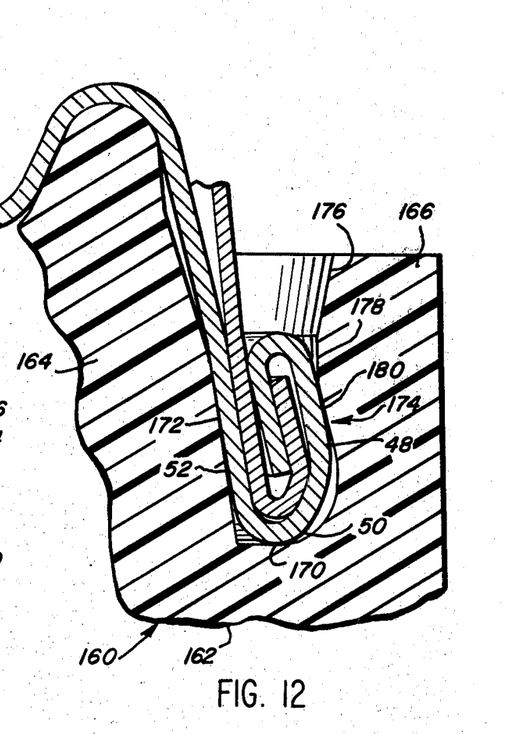
FIG. 12 is a cross-sectional view illustrating portions of the seamed top of a beer can and the anti-buckle ring of FIG. 10 in the position where the double seam is mated with the snap-fit portion of the anti-buckle ring.

Another anti-buckle ring 160, as shown in FIGS. 10-12, operates similarly to the previously described rings, but it has the further advantage of being able to accommodate double seams whose outer diameter varies over a greater range.

The ring 160 has a circumferentially extending base portion 162 from which protrudes an inner flange 164 and an outer flange 166. A circularly extending groove 168 separates flanges 164 and 166. Groove 168 is defined by a curving bottom wall 170, an inner wall 172, and an outer wall 174.

In this preferred embodiment, anti-buckle ring 160 cosists of a plastic material constructed by injection molding. The plastic is normally impregnated with approximately a ten percent glass-filled polycarbonate resin such as Lexan 500. As a result, the outer flange 166 is characteristically resilient.

The outer flange 166 has a contoured, snap-fit wall 174 which flexes outwardly to permit the seaming wall radius 48 of the double-seam 18 to pass therethrough during the assembly or disassembly of the ring 160 with the beer can 10. This flexing activity is discussed in more detail below.

The snap-fit wall 174 includes a first tapered surface 176, a vertical return wall portion 178, and a second tapered surface 180. The first tapered surface 176 extends downwardly and inwardly to the vertical return wall portion 178. The second tapered surface 180 extends downwardly and outwardly from the vertical return wall portion 178 at approximately a twelve degree angle and connects with the curving bottom wall 170.

Prior to the assembly of the ring 160 with the beer can 10, the outer flange 166 maintains an unstressed position. However, as the double-seam 18 is pressed downwardly into the groove 168 against the inner wall 172 and the return wall portion 178 of the snap-fit wall 174, the snap-fit wall 174 begins to flex outwardly. The greatest degree of flexing occurs when the widest portion of the double-seam 18 passes by the lower end of return wall portion 178. Thereafter, the return wall portion 178 moves back towards its unstressed position until the bottom panel 50 of the double-seam 18 makes contact with the curved bottom wall 170 (see FIG. 12). In the assembled position, the second tapered surface 180 of the snap-fit wall 174 is closely adjacent or in contact with the seaming wall radius 48. Similarly, the inner wall 172 is closely adjacent or in contact with the chuck wall 52 of the can. In this position, the can's double seam is held from radial displacement as previously described.

The snap-fit wall 174 again flexes during the disassembly of the ring 160 from the beer can 10. As the double-seam 18 moves away from the bottom wall 170, the seaming wall radius 48 pushes against the second tapered surface 180 creating an increasingly outward flexing of the snap-fit wall 174 until the widest portion of the double-seam 18 passes above the lower end of return wall portion 178. Thereafter, the return wall portion retracts until its unstressed position is reached.

With this arrangement, double-seams of various outer diameters are accommodated by the ring 160 for holding the double-seams from radial displacement during the pasteurization process. The characteristically resilient outer flange 166 snaps tightly against the varying outer portion of the double-seams. Only the outer flange needs to be constructed of a flexible or resilient material in order for the ring 160 to accommodate these varying outer portions.

It is understood that the assembly and disassembly of the anti-buckle ring 160 to and from can 10, requires the implementation of mechanical equipment. The assembly can simply be performed by using the can/ring assembler 70 of FIG. 6 in combination with overhead camactuated push rods (not shown) to push can 10 down into ring 160. For disassembly, the preferred embodiment separator 84 may be employed.

In an alternative embodiment, as shown only by dotted line 182 in FIG. 11, the anti-buckle ring may have an inner flange 164 constructed of stainless steel and an outer flange 166 constructed of resilient plastic material. The two flanges are fit together to align their correspondingly mated portions.

By virtue of the above described method and apparatus for processing beer cans, it is possible to use thinner gauge or different alloys for the beer can top, thereby reducing the cost of a beer can and yet preventing buckle of the beer can during heat treatment. Moreover, the anti-buckle ring described herein is adapted for fast feeding characteristics during can/ring assembly and separation and remains stably mated with a beer can during high-speed can travel. In addition, the use of the antibuckle ring requires no changes in conventional pasteurization techniques.

In some instances, a beer can is made of three pieces of metal, one piece for the can body and the other two pieces for the can's top and the bottom. With such three piece beer cans, both the top and the bottom of the can may have a double-seam, in which case the anti-buckle rings described above may be used to capture either the top of the can, the bottom of the can, or both. Hence, when reference herein is made to a can's double-seamed top of a conventional two piece beer can, it is intended to also include the double-seamed bottom of a three piece beer can.

Although the invention has been described in connection with a specific processing method and preferred ring construction, it will be obvious to those skilled in the art that many alternations and modifications to the invention may be made without departing from the spirit and scope of the invention. Accordingly, it is intended that all such alterations and modifications be included within the scope of the invention as defined by the appended claims.

What is claimed is:

1. An anti-buckler for preventing buckling of the seamed top of a beer can when the canned beer is heat treated during pasteurization comprising:

a ring having a circumferentially extending outer flange and a base portion extending radially inwardly of the outer flange, said outer flange and said base portion being dimensioned such that the ring is adapted to slip onto the top of a beer can with the base portion of the ring at least closely adjacent the top of the seam and the outer flange portion of the ring holding the seam from radial displacement, whereby the ring prevents the top of the can from buckling in response to high internal can pressure present during pasteurization.

2. An anti-buckler as set forth in claim 1 wherein said base portion includes an inner flange displaced radially inwardly of said outer flange so as to define a groove for receiving the can's seam and for bracing the seam against radial shifting.

3. An anti-buckler as set forth in claim 2 wherein the can's top includes a rounded chuck wall radius and a panel radius, and wherein said inner flange extends toward the can's chuck wall radius and is contoured to conform substantially to the contour of the chuck wall radius and the panel radius such that, upon capturing of the can's top by the ring, the mutually conforming portions of the inner flange and the can's top are closely adjacent whereby distortion of the chuck wall radius and the panel radius is prevented.

4. An anti-buckler as set forth in claim 2 wherein at least said outer flange is a resilient material dimensioned to snap tightly against the outer portion of the seam to capture the can top, and said groove is defined by the interior surfaces of said inner and outer flanges.

5. An anti-buckler as set forth in claim 4 wherein the can's seam includes a seaming wall radius and wherein said outer flange includes a press-fit wall, said press fit wall being contoured and resilient for expanding to permit said seaming wall radius to pass therethrough and for retracting so that said seam is maintained closely adjacent said outer flange.

6. An anti-buckler for preventing buckling of the top of a beer can when the canned beer is heat treated during pasteurization wherein the outer portion of said seamed top includes a seaming wall and seaming wall radius comprising:
a ring having concentric outer and inner flanges, said inner flange being radially displaced inwardly of said outer flange so as to define a groove for receiving and bracing the seamed top, said outer flange including a contoured and reslient press-fit wall for expanding to permit the seaming wall radius of said seam to pass therethrough and for retracting so that the seaming wall is maintained closely adjacent said outer flange, thereby holding the seam from radial displacement.

7. An anti-buckler as set forth in claim 6 wherein the can's top includes a rounded chuck wall radius and a panel radius, and wherein said inner flange extends toward the can's chuck wall radius and is contoured to conform substantially to the contour of the chuck wall radius and the panel radius such that, upon capturing of the can's top by the ring, the mutually conforming portions of the inner flange and the can's top are closely adjacent, whereby distortion of the chuck wall radius and the panel radius is prevented.

* * * * *